Aug. 17, 1965 W. A. MALEY 3,201,085
FENCE WIRE TENSIONING APPARATUS
Filed March 8, 1963 2 Sheets-Sheet 1
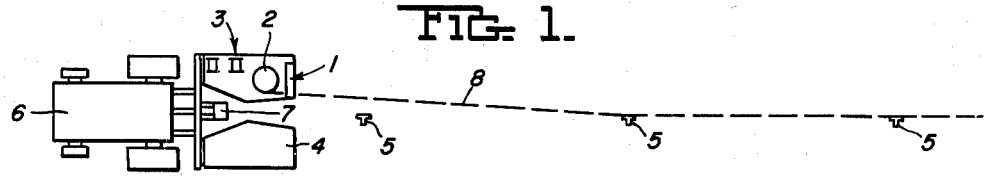
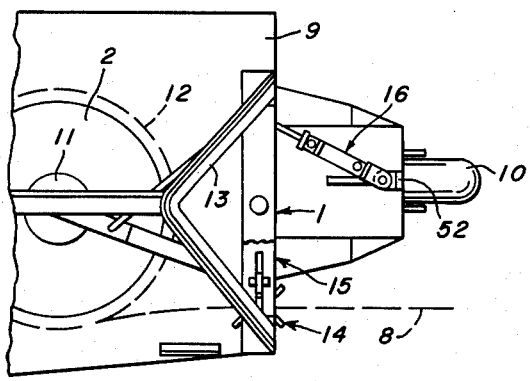
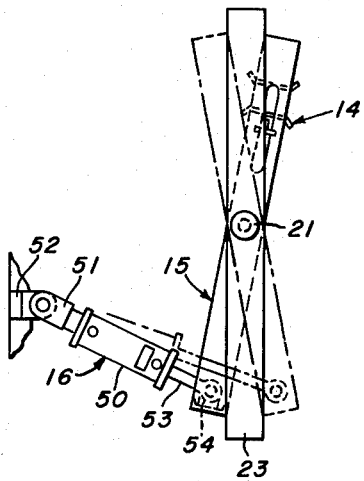
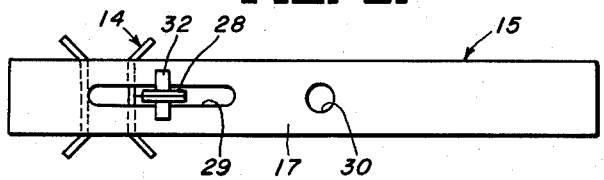
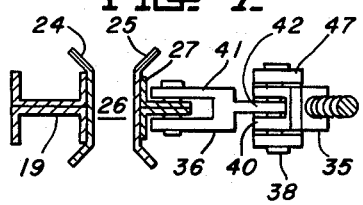
INVENTOR.
WAYNE A. MALEY
By Donald H. Dalton
Attorney Aug. 17, 1965   W. A. MALEY   3,201,085
FENCE WIRE TENSIONING APPARATUS
Filed March 8, 1963   2 Sheets-Sheet 2

INVENTOR.
WAYNE A. MALEY
By Donald G. Dalton
Attorney

United States Patent Office 3,201,085
Patented Aug. 17, 1965

3,201,085
FENCE WIRE TENSIONING APPARATUS
Wayne A. Maley, Des Moines, Iowa, assignor to United
States Steel Corporation, a corporation of New Jersey
Filed Mar. 8, 1963, Ser. No. 263,826
8 Claims. (Cl. 254—64)

This invention relates, as indicated, to an apparatus for tensioning fence wire and, more particularly, to a tensioning mechanism that enables the erection of wire fence in which the wire is strung under a controlled and uniform tension.

The tensioning mechanism of this invention is especially suited for fence erecting machines of the type in which a carriage is drawn along a fence line by a tractor and has a post driver and a fence wire dispensing reel mounted thereon. In such machines the post driver is operated to install fence posts at spaced intervals along the fence line and the fence wire is pulled from the dispensing reel and strung along the fence posts as the carriage is drawn forwardly by the tractor. After a given length of wire has been strung in position, tension must be applied to the wire before it is fastened to the fence posts.

While the use of a clamp and forward movement of the carriage by the tractor to which it is hitched have been proposed for applying preliminary tension to the wire prior to its being fastened to the posts, several disadvantages and operational problems have been found to result from this practice. First, precise movement of the tractor and attached stringing apparatus along the fence line during the wire stringing operation is required, which proved very difficult. Second, operation of the tractor to place the wire under tension required careful brake and clutch operation of the tractor and even then a slight movement of the tractor after being stopped would result in a loss of tension on the wire. Third, uniform tension on all portions of the fence could not be had, since some portions would be strung tighter than other portions.

One of the principal objects of this invention is, accordingly, to provide fence wire tensioning apparatus that eliminates the problems and disadvantages mentioned above and enables fence wire being strung along a line of fence posts under a controlled and uniform tension.

A further object of the invention is to provide an apparatus in which tension is applied to the wire by a fluid pressure operated mechanism preferably in the form of an hydraulic motor.

Another object of the invention is to provide on a tractor-drawn carriage a movable support for a fence wire tensioning clamp and a fluid pressure motor for moving the support to render the clamp carried thereby effective to impart tension to fence wire engaged thereby. A related object is to provide an apparatus of this character in which the movable support comprises a frame that is mounted for pivotal movement about a vertical axis on the carriage.

Other objects and advantages of the invention will become apparent from the following description and the accompanying drawings, in which:

FIGURE 1 is a diagrammatic plan view of a fence erecting machine of the type in which the tensioning apparatus of this invention is employed;

FIGURE 2 is an enlarged fragmentary plan view of a portion of the machine shown in FIGURE 1 that includes the tensioning apparatus of this invention;

FIGURE 5 is a plan view of the structure shown in FIGURE 4 which illustrates the manner in which the tensioning frame is pivoted to apply tension to fence wire;

FIGURE 6 is a plan view of the tensioning frame shown in FIGURE 3; and

FIGURE 7 is a sectional view taken substantially along the line VII—VII of FIGURE 3.

Figure 3:
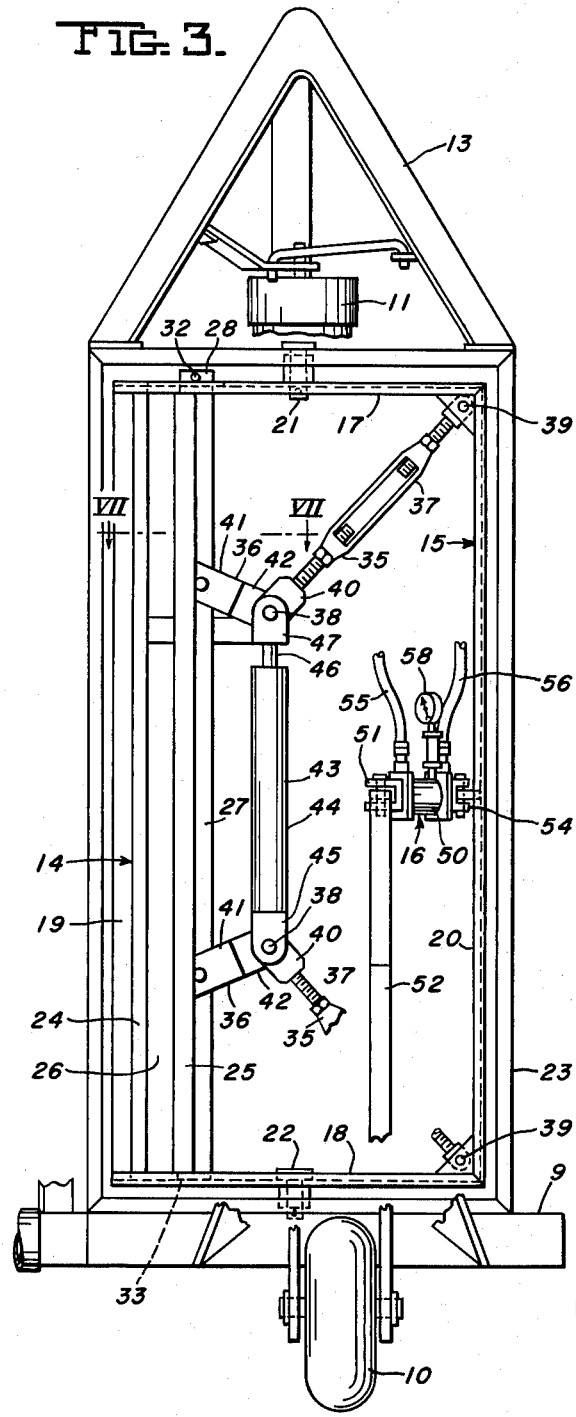
FIGURE 3 is an end elevational view taken in a direction looking from the right of FIGURE 2.

FIGURE 1 of the drawings shows the relative arrangement of the tensioning apparatus 1 of this invention and a wire dispensing reel 2 in a machine 3 for erecting wire fence. As shown, the machine 3 comprises a carriage 4 that is pulled forwardly along a line of fence posts 5 by a tractor or other traction vehicle 6 and on which the dispensing reel 2 and the tensioning apparatus of this invention are mounted. The carriage 4 further furnishes a support for a fence post driver 7 that is operated to install the fence posts 5 at spaced intervals along a fence line. As the carriage 4 is drawn forwardly by the tractor 6, fence wire, designated diagrammatically by the broken line 8, is pulled from the reel 2 and is strung along the posts 5. After a desired length of fence wire has been strung in this manner, the tractor is stopped and its brakes are applied to hold the carriage 4 against movement while the tensioning apparatus 1 is operated in a manner to be described to apply tension to the wire 8. After being placed under the desired tension, the wire 8 is fastened to the posts 5.

Figure 4:
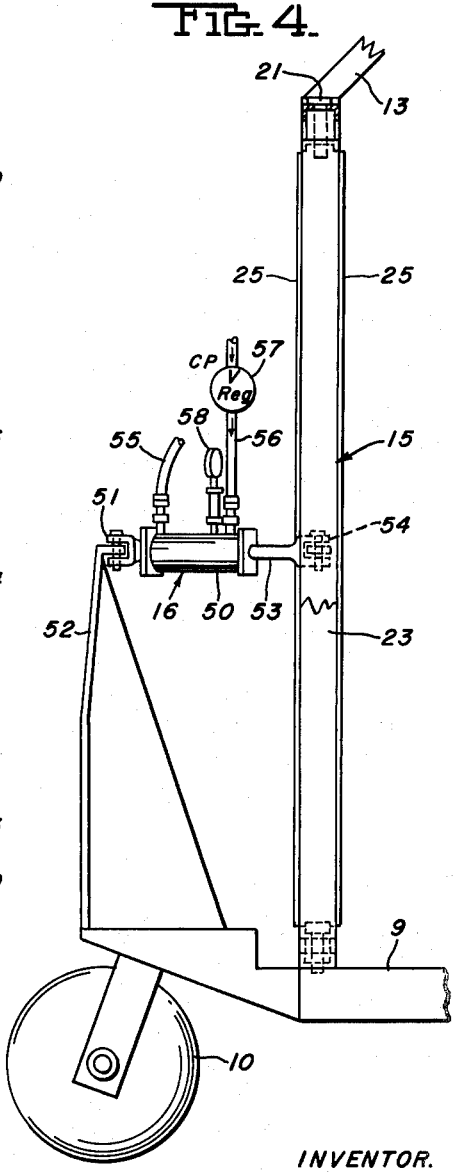
FIGURE 4 is a partial side view of the apparatus shown in FIGURE 3 in which portions are broken away to show the construction and mounting of the tensioning frame.

As shown in greater detail in FIGURES 2–4, the tensioning mechanism 1 and reel 2 are mounted on a platform 9 that forms part of the carriage 4 and is supported at its trailing end by a caster 10 for rolling movement over the ground. The reel 2 comprises a stem 11 that extends axially of and provides a rotatable support for a coil 12 of woven fence wire to be strung along the fence posts 5. The stem 11 is held in a vertical position on the platform 9 by a bracing framework 13. The tensioning apparatus 1 comprises a fence wire clamp 14, a tensioning frame 15 on which the clamp 14 is mounted for movement relative to the carriage 4 in a direction generally parallel to the fence line, and a fluid pressure motor 16 for moving the frame 15 to render the clamp 14 effective to impart tension to fence wire engaged thereby.

The tensioning frame 15 is rectangular in shape and has horizontal top and bottom channels 17 and 18 and vertical side channels 19 and 20. Pivotal connections 21 and 22, respectively arranged centrally of the top and bottom channels 17 and 18, furnish a pivotal support for the tensioning frame 15 in a stationary frame 23. The frame 23 is rigidly secured at its lower end to the platform 9, and is fastened at its upper end to the framework 13 so that it furnishes part of the support for the reel 2. The pivotal connections 21 and 22 provide for pivotal movement of the tensioning frame 15 about a vertical axis that is arranged centrally between its sides 19 and 20 for a purpose to be described.

The clamp 14 comprises a pair of parallel and laterally spaced clamping bars 24 and 25 that are arranged on opposite sides of and define a vertical pass 26 for the wire 8 extending from the reel 2 to the fence posts 5. The clamping bar 24 is secured to the frame side channel 19 in a fixed position relative to the frame 15, and the clamping bar 25 is supported for lateral movement on the frame 15 between its side channels 19 and 20. For this purpose, the movable clamping bar 25 is secured to a T-shaped bar 27 (FIGURE 7) that has a tongue 28 at its upper end which projects through a guide slot 29 in the top channel 17, which further has a central opening 30 through which the pivot pin of the top pivotal connection 21 extends. The assembly of the clamping bar 25 and T-shaped bar 27 is suspended on the frame 15 by a pin 32 that extends transversely with respect to the tongue 28 and has its opposite ends supported on the upper surface of the top channel 17. Movement of the clamping bar 25 toward and away from the clamping bar 24 is guided by engagement of the tongue 28 in the slot 29 and by the bottom portion 33 of the bar 27 which extends into the space between and is guided by the side flanges of the bottom channel 18.

The mechanism for moving the clamping bar 25 to and from a wire clamping position relative to the clamping bar 24 comprises a pair of identical upper and lower toggle linkages 35. Each of the toggle linkages 35 comprises a pair of links 36 and 37 that have their adjacent ends connected by a common pivot 38 and their other ends connected respectively with the frame 15 and the T-shaped bar 27. The links 37 as illustrated are turnbuckles that respectively have a pivot connection 39 at one end with a corner of the frame 15 and a clevis 40 at the opposite end thereof that is connected with the common pivot 38. Each link 36 has a clevis 41 at one end that is pivotally connected with the T-shaped bar 27 and a tongue 42 at its other end which is received in the clevis 40 where it is connected with the common pivot 38. The common pivots 38 are spaced vertically relative to each other and their vertical spacing is controlled by a reversible fluid-pressure double acting motor 43 under the control of a reversing valve (not shown). The motor 43 comprises a cylinder 44 that has a clevis 45 at its lower end and a piston rod 46 projecting from its upper end. The clevis 45 is connected with the common pivot 38 of the lower toggle linkage 35 and the piston rod 46 is connected by a clevis 47 to the common pivot 38 of the upper toggle linkage 35.

FIGURE 3 shows the relative positions of the toggle linkages 35 and the clamping bars 24 and 25 when the piston rod 46 is retracted in the cylinder 44 and, in this position, the vertical pass 26 between the bars 24 and 25 is open and provides for free movement of the fence wire 8 therethrough. When the motor 43 is operated to move the piston rod 46 to an extended position relative to the cylinder 44, the common pivot connections 38 are moved in opposite directions to increase their vertical spacing. This movement of the pivots 38 operates to straighten the toggle linkages 35 and move the clamping bar 25 toward the clamping bar 24 and into clamping engagement with fence wire in the pass 26. The specific structure of the clamp 14, with regard to the clamping bars 24 and 25 and the operating connections by which the bar 25 is operated by the motor 43 to a clamping position relative to the bar 24, forms the subject matter of Sherwood S. De Forest application Serial No. 83,706, filed Jan. 19, 1961, now Patent No. 3,104,863.

The motor 16 for imparting pivotal movement to the tensioning frame 15 comprises a cylinder 50 that has a pin and clevis connection 51 at one end with a stationary bracket 52 projecting upwardly from the carriage platform 9. A piston rod 53 extends from the other end of the cylinder 50 and has a pin and clevis connection 54 to the vertical side channel 20 of the tensioning frame 15 at a point centrally thereof. The motor 16 is preferably hydraulically actuated and has conduits 55 and 56 connected to opposite ends thereof through which fluid pressure is supplied and exhausted under the control of a reversing valve (not shown). A manually adjustable regulating or control valve 57 regulates the pressure of the fluid supplied through the conduit 56 for retracting the piston rod 53 in the cylinder 50 and thereby the tensioning force applied to the tensioning frame 15. The pressure of the fluid supplied through the conduit 56 to the cylinder 50 is indicated by a gauge 58. The gauge 58 may be calibrated to indicate the tension applied to fence wire.

Attention is particularly directed to the fact that the pivotal mounting of the tensioning frame 15 on the carriage frame 23 is such that fence wire being dispensed from the reel 2 extends tangentially from the coil 12 through the pass 26 of the clamp 14 and along the fence line. It will also be noted that the clamp 14, during pivotal movement of the tensioning frame 15 between the two positions shown in FIGURE 5 of the drawings, travels over an arcuate path that is tangential to the line over which the wire extends from the tensioning apparatus 1 to the fence posts 5, and thus over a path that is generally parallel to the fence line.

In operation, the machine 3 is drawn along a fence line by the tractor 6 and the post driver is operated at spaced intervals along its path of travel to install fence posts 5. After installation of a corner or end post, fence wire is threaded through the clamping pass 26 and attached to such corner or end post so that it is strung along the fence posts 5 as the forward movement of the machine 3 is continued. When a sufficient length of wire has been strung along the fence posts 5, the tractor 6 is stopped and its brakes are applied to hold the carriage 4 against movement. The clamping frame 15 is then pivoted in a counter-clockwise direction as viewed in FIGURE 5 to the position shown in dotted lines in which the piston rod 53 is fully extended relative to the motor cylinder 50, after which the motor 43 is operated to straighten the toggle linkages 35 and move the bar 25 into clamping engagement with the wire 8 in the pass 26. The motor 50 is then operated to pivot the frame 15 in a clockwise direction as viewed in FIGURE 5 and thus move the clamp 14 carried thereby tangentially along the fence line to apply tension to the fence wire 8. As explained above, the pressure applied through the conduit 56 to the cylinder 50 is controlled by the valve 57 and the tension thus applied to the fence wire may be accurately controlled. The valve 57 and motor 16 thus enable the application of an accurately controlled and predetermined tension to the fence wire 8 at each tensioning operation of the clamp 14, and the erection of wire fence in which all portions are under the same tension.

While one embodiment of my invention has been shown and described it will be apparent that other adaptations and modifications may be made without departing from the scope of the following claims.

I claim:

1. In a fence wire stringing apparatus of the type including a carriage, a tractor for moving said carriage along a fence line and for anchoring it in a stationary position, and a reel for a coil of fence wire on said carriage and from which fence wire is strung along said fence line upon movement of said carriage, a fence wire tensioning apparatus comprising a frame mounted on said carriage for movement relative thereto in a direction generally parallel to said fence line, a clamp on said frame for clamping engagement with said fence wire, and power means for moving said frame relative to said carriage to render said clamp effective to apply tension to said fence wire.

2. In a fence wire stringing apparatus of the type including a carriage, a tractor for moving said carriage along a fence line and for anchoring it in a stationary position, and a reel for a coil of fence wire on said carriage and from which fence wire is strung along said fence line upon movement of said carriage, a fence wire tensioning apparatus comprising a frame pivotally supported on said carriage for movement about a vertical axis, a clamp for clamping engagement with said fence wire, means mounting said clamp on said frame in a position such that it travels over an arcuate path tangential to said fence line upon pivotal movement of said frame, means including a fluid pressure motor for pivoting said frame to move said clamp over said path and render it effective to apply tension to said fence wire, and a valve for regulating the force applied by said motor to said frame and thereby the tension applied by said clamp to said fence wire.

3. In a fence wire stringing and tensioning apparatus, a platform adapted to occupy a stationary position along a line of fence wire, a frame pivotally supported on said platform for movement about a vertical axis, a clamp for clamping engagement with said fence wire, means mounting said clamp on said frame in a position such that it travels over an arcuate path tangential to said fence line upon pivotal movement of said frame, means including a fluid pressure motor for pivoting said frame to move said clamp over said path and render it effective to apply tension to said fence wire, and a valve for regulating the force applied by said motor to said frame and thereby the tension applied by said clamp to said fence wire.

4. In a fence wire stringing and tensioning apparatus, a platform adapted to occupy a stationary position along a line of fence wire, a fence wire clamping frame including a pair of clamping bars disposed vertically in laterally spaced positions on opposite sides of fence wire extending along said line, means mounting said bars for relative movement to and from a position in clamping engagement with the fence wire therebetween, and means for actuating said bars to their said clamping position, means mounting said clamping frame on said platform for movement of said clamping bars in a direction generally parallel to said fence line, power means for moving said frame to render said clamping bars effective to apply tension to fence wire engaged thereby, and control means for regulating the force applied by said power means to said frame and thereby the tension applied to said clamping bars to the fence wire.

5. In a fence wire stringing apparatus of the type including a carriage, a tractor for moving said carriage along a fence line and for anchoring it in a stationary position, and a reel for a coil of fence wire on said carriage and from which fence wire in strung along said fence line upon movement of said carriage, a fence wire tensioning apparatus comprising a frame pivotally supported on said carriage for movement about a vertical axis, fence wire clamping means on said frame including a pair of clamping bars disposed vertically in laterally spaced positions on opposite sides of fence wire extending along said line, means mounting said bars for relative movement to and from a position in clamping engagement with the fence wire therebetween, and means for actuating said bars to their said clamping position, said clamping bars being movable over an arcuate path tangential to said fence line upon pivotal movement of said frame, power means including a fluid pressure motor for pivoting said frame to move said clamping bars over said arcuate path and render them effective to apply tension to fence wire engaged thereby, and a valve for regulating the force applied by said motor to said frame and thereby the tension applied by said clamping bars to the fence wire.

6. In an apparatus for tensioning wire fence, a platform adapted to occupy a stationary position along a line of wire fence, a frame mounted on said platform for movement relative thereto in a direction generally parallel to said line, a clamp on said frame for clamping engagement with the wire in said fence, and power means for moving said frame relative to said platform to apply tension to the wire engaged by said clamp, said power means comprising a fluid pressure motor and an adjustable valve for regulating the tensioning force applied thereby to said frame.

7. Fence wire tensioning apparatus as defined in claim 6 characterized by a pressure gauge for indicating the tensioning force applied by said motor to said frame.

8. In an apparatus for tensioning wire fence, a platform adapted to occupy a stationary position along a line of wire fence, a frame mounted on said platform for movement relative thereto in a direction generally parallel to said line, a clamp on said frame for clamping engagement with the wire in said fence, and power means for moving said frame relative to said platform to apply tension to the wire engaged by said clamp, said frame being supported on said platform for pivotal movement about a vertical axis and said clamp being movable thereby over an arcuate path tangential to said fence wire line.

References Cited by the Examiner
UNITED STATES PATENTS

| | | | |
|---|---|---|---|
| 684,475 | 10/01 | Tanner | 254—67 |
| 834,976 | 11/06 | Hampton | 254—83 |
| 1,273,889 | 7/18 | Logan | 254—51 |
| 1,766,812 | 6/30 | Damerell | 269—228 |
| 2,914,270 | 11/59 | Parker et al. | 254—64 X |
| 3,048,348 | 8/62 | Griffin | 254—64 X |
| 3,104,863 | 9/63 | De Forest | 254—83 X |

WILLIAM FELDMAN, *Primary Examiner.*

MILTON S. MEHR, *Examiner.*